United States Patent [19]

Asai et al.

[11] Patent Number: 5,468,593
[45] Date of Patent: Nov. 21, 1995

[54] OPTICAL RECORDING MEDIUM

[75] Inventors: Nobutoshi Asai; Takashi Iwamura; Shin-Ichiro Tamura, all of Kanagawa, Japan

[73] Assignee: Sony Corporation, Tokyo, Japan

[21] Appl. No.: 856,119

[22] Filed: Mar. 23, 1992

[30] Foreign Application Priority Data

Mar. 22, 1991 [JP] Japan ................................. 3-083385

[51] Int. Cl.$^6$ ................................................. G11B 7/24
[52] U.S. Cl. ........................ 430/273; 430/945; 269/287; 269/284
[58] Field of Search ............................ 430/273, 945, 430/495; 369/287, 288, 284

[56] References Cited

U.S. PATENT DOCUMENTS

| | | | |
|---|---|---|---|
| 4,069,487 | 1/1978 | Kasai et al. | 346/76 L |
| 4,340,655 | 7/1982 | Hollister et al. | 430/14 |
| 4,435,070 | 5/1989 | Kurokawa et al. | 428/64 |
| 4,945,249 | 1/1991 | Kamezaki et al. | 428/64 |
| 5,002,463 | 3/1991 | Dust et al. | 430/495 |
| 5,013,594 | 5/1991 | Mizumura et al. | 428/64 |
| 5,236,755 | 8/1993 | Howe et al. | 428/64 |

FOREIGN PATENT DOCUMENTS

| | | | |
|---|---|---|---|
| 63-009574 | 1/1988 | Japan . | |
| 3-067262 | 3/1991 | Japan | 430/273 |

*Primary Examiner*—Charles L. Bowers, Jr.
*Assistant Examiner*—John A. McPherson
*Attorney, Agent, or Firm*—Hill, Steadman & Simpson

[57] ABSTRACT

A tape-shaped optical recording medium, in which a recording layer capable of optically recording or reproducing information signals is formed on a flexible base, is disclosed. A protective film formed of a soluble high polymer having a contact angle with respect to water of not less than 100° C. and a glass transition temperature of not lower than 100° C. is formed on the recording layer. The soluble high polymer may be a fluorine-based polymer, such as a tetrafluoroethylene-dioxole copolymer. The protective film has a film thickness in a range of from 0.25 $\lambda/n$ to 0.5 $\lambda/n$, where $\lambda$ is a wavelength of a playback light and n is a refractive index of the protective film.

5 Claims, 3 Drawing Sheets

OPTICAL RECORDING MEDIUM

BACKGROUND OF THE INVENTION

1. Field of the Invention

This invention relates to an optical recording medium for recording and/or reproducing the information by laser beam radiation and, more particularly, to an optical recording medium advantageously employed as a tape-shaped recording medium.

2. Description of the Related Art

An optical recording medium for recording and/or reproducing the information by laser light radiation usually has a base plate on which is formed a recording layer formed of an optical recording material. For recording, the laser light is converged on this recording layer to form pits. For reproducing the recorded information, the difference in reflectance between the pits and lands between the pits is detected. It is possible with such optical recording medium to narrow the track width as compared with that with the magnetic recording medium, for example, to enable high density recording. For this reason, it is attracting attention as a recording medium for mass storage medium and investigations are proceeding briskly towards improving the quantity of the storable information.

As such optical recording medium, a disc-shaped recording medium, such as a digital audio disc (so-called compact disc) or an optical video disc (so-called laser disc), is in popular use.

If it is desired to increase the amount of the information recorded on one disc, it is necessary to increase the pit density on the disc or to increase the diameter of the disc itself to increase the area on which the pits can be formed. However, if the pit density is excessively increased in the optical recording medium, signal crosstalks may be produced due to playback resolution limits proper to the playback optical system to render it impossible to detect the information satisfactorily. On the other hand, if the diameter of the disc itself is increased, the playback apparatus needs to be increased in size. In addition, the large-sized disc is liable to be damaged while being inconvenient for transport or storage. For these reasons, it is practically difficult to increase the quantity of information storage of the disc-shaped recording medium beyond the current level.

Recently, researches and development have been conducted of a tape-shaped optical recording medium, as shown for example in JP Paten KOKAI Publication No. 55-86782 (1980), as an optical recording medium having a larger storage volume than that of the disc-shaped recording medium. Such tape-shaped recording medium may be increased in length to maintain a pit-forming area markedly larger than that of the disc-shaped recording medium. Since the tape remains unchanged in outer size even if it is increased in length, a large storage quantity may be provided while maintaining its practical merits such as facility in transport or storability.

Meanwhile, for recording and/or reproducing such tape-shaped optical recording medium by a recording and/or reproducing apparatus, the recording medium is caused to travel with its recording layer kept in sliding contact with a drum as in the case of other tape-shaped recording media. Therefore, for stable recording or reproduction, it is necessary to take measures for reducing the friction between the surface of the medium and the drum and for preventing damages to the recording layer. These measures are particularly critical when employing a drum-shaped optical system which is rotated at an elevated speed for achieving a high information transfer speed.

For these reasons, a protective layer of a UV curable resin or a cross-linkable resin is provided on the tape-shaped optical recording medium in the conventional practice for diminishing the friction and wear otherwise caused to the tape-shaped optical recording medium. Such protective layer is effective to inhibit the friction and wear or to inhibit changes in pit shape as disclosed in JP Patent KOKAI Publication No. 58-94145 (1983) as well as to prevent debris produced during pit formation from being scattered to inhibit resulting defects.

However, the UV curable resins or the cross-linkable resins cannot be said to be excellent in optical transparency required of a protective film for the optical recording medium. The optical recording medium having its protective film formed of such resin suffers from a drawback that the laser light is deteriorated when being transmitted through the protective film so that satisfactory recording and/or reproducing characteristics can not be achieved. Besides, the frictional resistance and wear resistance of such recording medium are also inferior such that the running performance or durability of the tape-shaped recording medium cannot be improved satisfactorily.

OBJECT AND SUMMARY OF THE INVENTION

It is therefore an object of the present invention to provide an optical recording medium having a protective film which is low in friction and excellent in wear resistance and optical transparency such that satisfactory recording/playback characteristics may be obtained when the recording medium is used as a tape-shaped recording medium.

As a result of our perseverant investigations, it has now been found by the present inventors that the resistance to friction and wear in a protective film depends on surface energies and the glass transition temperature of the protective film and may be improved by optimizing the contact angle with respect to water as an index of surface tension and the glass transition temperature.

The optical recording medium of the present invention, which has been completed based on this information, is an optical recording medium comprising a flexible base and a recording layer adapted for recording and/or reproducing the information formed thereon, said recording layer having formed thereon a protective film of a soluble high polymer material having a contact angle with respect to water of not less than 100° with respect to water at 25° C. and the glass transition temperature of not lower than 100° C., said protective film having a film thickness of not less than 0.25 $\lambda/n$ and not more than 0.5 $\lambda/n$, where $\lambda$ is a wavelength of a playback light and n is a refractive index of the protective film.

A soluble high polymer having a contact angle with water at 25° C. of not less than 100° and a glass transition temperature of not lower than 100° C. exhibits low friction and wear resistance.

Therefore, an optical recording medium on which the soluble high polymer material is deposited as a protective film undergoes less friction and wear due to contact with a drum and exhibits good running performance and durability when used as a tape-shaped recording medium.

On the other hand, if the protective film of the optical recording medium has a predetermined film thickness, a significant difference in reflectance is produced between the pits and the lands defined between the pits, so that pit signals may be detected accurately to achieve a high CN ratio to assure practically sufficient sensitivity and handling ease.

Besides, if a fluorine-based polymer is used as the above-mentioned soluble high polymer which not only satisfies the above requirements but exhibits extremely high optical transparency, the laser light is deteriorated only insignificantly by the transmission of the laser light through the protective film to assure recording /playback with high sensitivity.

With the optical recording medium of the present invention, on which is formed the protective film having an optimum contact angle with water, glass transition temperature and film thickness, the friction may be diminished and wear resistance may be improved while maintaining recording/playback characteristics, such as recording sensitivities or signal intensities, Thus the optical recording medium of the present invention may be used satisfactorily as a tape-shaped recording medium which is adapted for recording and/or reproducing information signals while travelling at an elevated speed about a helical scan type rotating drum, so that high recording density may be achieved and the recording and/or reproducing apparatus may be reduced to the size of a VTR.

DESCRIPTION OF THE INVENTION

A flexible base of an optical recording medium of the present invention, on which the recording layer is formed, may be formed of any material commonly used as a base material for the tape-shaped recording medium, such as a high polymer resin, e.g. polyethylene terephthalate, polyester, polyamide or polyimide.

Since the optical recording medium is used as a tape-shaped recording medium, the recording material formed on the base is also preferably such a material which is flexible when formed as a recording layer. Examples of such optical recording materials include organic recording materials, such as cyanine dyes, naphthoquinone dyes or phthalocyanine dyes.

For assuring running characteristics and wear resistance in the optical recording medium of the present invention, a protective film of a soluble high polymer material having a contact angle with water at 25° C. of not lower than 100° and a glass transition point of not lower than 100° C. and preferably of not lower than 160° C. is formed on the recording layer. Such protective film having these characteristics is excellent in frictional resistance and wear resistance and may be used advantageously as a protective film for the tape-shaped recording medium.

In consideration of recording/playback characteristics, the film thickness of the protective film is selected to be not less than 0.25 $\lambda/n$ and not more than 0.5 $\lambda/n$, where $\lambda$ is the wavelength of the playback light and n is the refractive index of the protective film.

Figure 1:
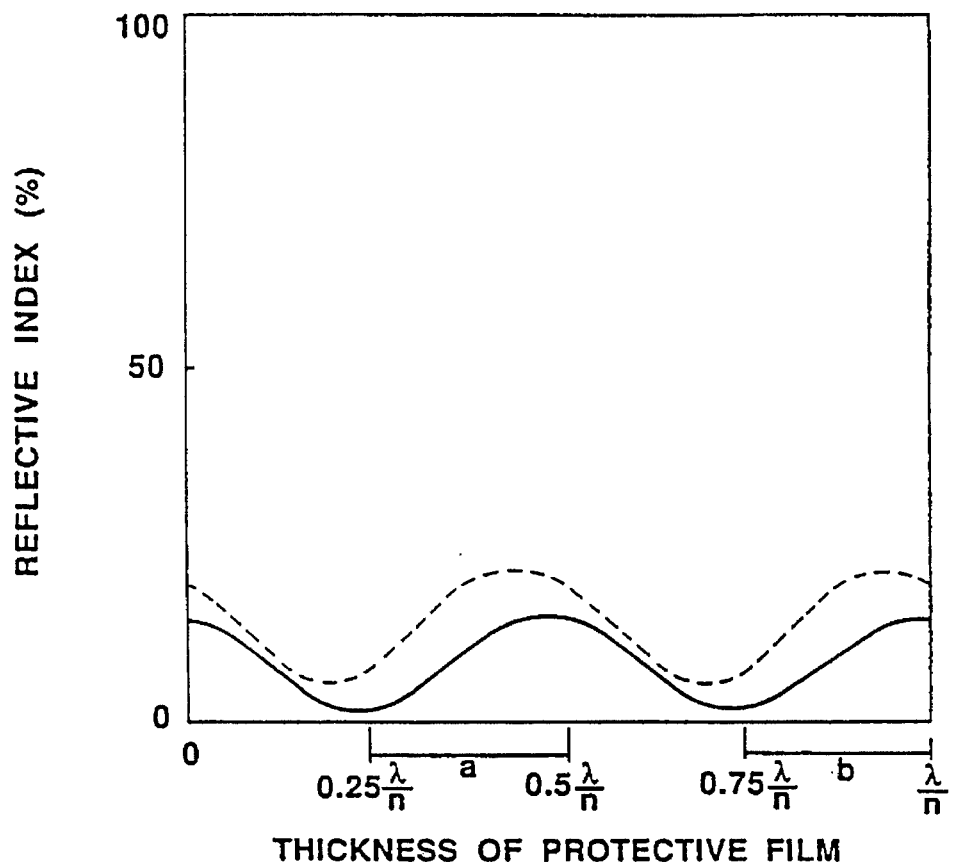
FIG. 1 is a graph showing the relation between the thickness of the protective film and the reflectance of an optical recording medium.

That is, with the optical recording medium provided with the protective film formed of the above-mentioned soluble high polymer material, the reflectance of the laser light is changed with the film thickness of the protective film as shown in FIG. 1, wherein the solid line indicates the reflectance of a recording layer showing weak light absorption and the broken line indicates the reflectance of a recording layer showing a strong light absorption.

For producing satisfactory pit signals, the protective film needs to be of such a film thickness as to increase the reflectance. Thus it is contemplated to be preferred to set the film thickness so as to be in ranges a or b shown in FIG. 1. However, if the protective film has an excessive film thickness, as shown for example by the range b, both the sensitivity and handling ease are lowered. For this reason, the film thickness of the protective film is set so as to be in the range a in FIG. 1, from the viewpoint of realizing low friction and wear resistance as well as increasing the CN ratio and high sensitivity and procuring handling ease.

In view of producing satisfactory detection signals, the refractive index n of the protective film is in a range of 1.25 to 1.5.

Typical of the soluble high polymer materials satisfying these characteristics is a fluorine-based polymer which, besides having the above characteristics, has an extremely high optical transparency. Thus the laser light transmitted through a protective film formed of the fluorine-based polymer undergoes only little loss of the light volume, so that satisfactory recording/playback characteristics may be achieved.

As such fluorine-based polymer, a tetrafluoroethylene (TFE)-dioxole copolymer, shown by the formula (1)

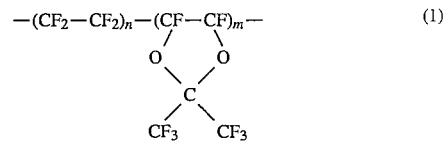

is preferred.

This copolymer, besides having characteristics suitable as the above-mentioned protective film, is soluble in a solvent in which ordinary organic materials are insoluble, that is an inactive solvent, such as one manufactured and sold by SUMITOMO 3M Inc. under the trade name of "Florinat", so that it may be easily formed into a film by a wet technique, such as dipping, gravure coating or spinning without curing. Meanwhile, this copolymer is an amorphous high polymer and may have its glass transition temperature and the refractive index adjusted in a desired manner by changing the proportion of the dioxole component in the copolymer.

The present invention will be hereinafter explained with reference to Examples and results of experiments.

EXAMPLE 1

The present Example is directed to a tape-shaped optical recording medium provided with a protective film of a soluble high polymer having an optimum contact angle with water, an optimum glass transition temperature and an optimum film thickness.

A cyanine dye, manufactured and sold under the trade name of NK125 by the NIPPON KANKO SHIKISO KK, and a polymer (PMMA having a molecular weight of 30000 to 400000) in a mixed solvent of methylene chloride, 1,1,2,2-tetrachloroethylene, cyclohexanone and ethanol were gravure-coated on a polyethylene terephthalate (PET) film, which is 20 μm in thickness, to form a recording layer, on which the fluorine polymers shown in Table 1 were dipped to form a protective layer. In this manner, tape-shaped optical recording media (sample tapes 1 to 3) having the protective layers thereon were prepared.

Meanwhile, 2 to 7 wt % of the fluorine-based polymer was dissolved in the solvent for dipping and, as such solvent for dipping, a solvent manufactured and sold under the trade name of CTsolv 100 by ASAHI GLASS KK was used for the fluorine-based polymer SAITOP manufactured by ASAHI GLASS KK, while a solvent manufactured and sold under the trade name of "Florinat" by SUMITOMO 3M Inc. was used for the fluorine-based polymers Teflon AF 1600 or Teflon AF2400.

The film thickness of each sample tape prepared in this manner was measured by reflection spectrum and found to be in the ranges of $\lambda/4n$ to $\lambda/2n$ (about 200 nm).

COMPARATIVE EXAMPLE 1

The present Example is directed to a tape-shaped optical recording medium provided with a protective layer of a high polymer material having the water contact angle and glass transition temperature which are outside the ranges of the present invention.

A tape-shaped recording medium (Comparative Tape 1) was prepared in the same way as in Example 1 except using polyvinyl alcohol (PVA) instead of the fluorine-based polymer as a protective film material.

COMPARATIVE EXAMPLE 2

The present Example is directed to a tape-shaped recording medium not having a protective film on the recording layer. A tape-shaped recording medium (Comparative Tape 2) was prepared in the same way as in Example 1 except not forming the protective film.

In the following Table 1, the refractive indices, the contact angles with water at 25° C. and the glass transition temperatures of the high polymer materials employed for the protective films in Example 1 and Comparative Example 1 are also shown.

For measuring the contact angle, a measuring device manufactured and sold by KYOWA KAGAKUSHA under the trade name of "Kyowa Contact Angle meter CA-D" was employed.

Studies of Running Performance and Wear Resistance of Tape-Shaped Recording Medium The dynamic frictional coefficients and the resistance to wear with respect to a variety of guide pins were checked of the sample tapes 1 to 3 and the Comparative Tapes 1 and 2 prepared as above.

For checking the wear resistance, the tapes were caused to run a predetermined number of times and the surface states thereof were checked visually.

For measuring the dynamic frictional coefficients, a frictional coefficient measuring device was used at a temperature of 25° C. and 60% relative humidity.

Figure 2:
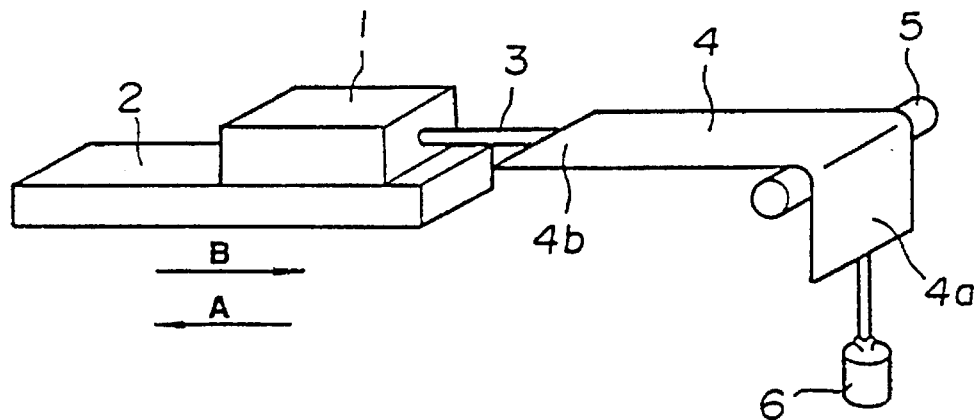
FIG. 2 is a schematic perspective view showing a frictional coefficient measurement device employed in measuring the dynamic frictional coefficient of an optical recording medium.

FIG. 2 shows the frictional coefficient measuring device employed in the present Examples.

This device is made up of a strain gauge 1 and a slider 2.

The strain gauge 1 is secured to the rectangular-shaped slider 2 and adapted to be moved along arrows A or B with movement of the slider 2.

The strain gauge 1 is provided with a clamp 3 for clamping an end of a tape under measurement, so that an electrical signal is produced when the tension of the tape under measurement is transmitted to the strain gauge 1 via the clamp 3.

Beyond the distal end of the clamp 3 is provided a sample guide pin 5 for sliding the tape.

For measuring the frictional coefficient of the tape 4 by such frictional coefficient measurement device, the tape 4 is placed around the sample guide pin 5 at a wrap angle of 90°. A weight 6 is attached to one end 4a of the tape 4, the other end 4b of which is fitted to the clamp 3 of the strain gauge 1. The slider 2 is moved in this state for shifting the strain gauge 1 at a constant speed in the direction shown by arrow A. This elevates the tape 4 along with the weight 6. The tension produced at this time in the tape 4 is applied to the strain gauge 1 via clamp 3 and converted into electrical signals to allow to find the frictional coefficient.

Meanwhile, in the present Example, measurement was effected with the diameter of the sample guide pin of 3 mm, the mass of the weight of 50 g and the sliding velocity being set to 5 mm/sec.

Table 2 shows the dynamic frictional coefficients measured in this manner.

TABLE 1

| | HIGH POLYMER MATERIAL NEED FOR PROTECTIVE FILM | REFRACTIVE INDEX n | CONTACT ANGLE WITH WATER (°) | GLASS TRANSITION POINT (°C.) |
| --- | --- | --- | --- | --- |
| SAMPLE TAPE 1 | SAITOP (mfd. BY ASAHI GLASS KK) | 1.29 | 105 | 240 |
| SAMPLE TAPE 2 | TEFLONAF1600 (mfd. BY DU PONT) | 1.31 | 104 | 160 |
| SAMPLE TAPE 3 | TEFLONAF2400 (mfd. BY DU PONT) | 1.34 | 110 | 108 |
| COMPARATIVE TAPE 1 | POLYVINYL ALCOHOL | 1.5 | 36 | 90 |

TABLE 2

|  | DYNAMIC FICTIONAL COEFFICIENT | |
| --- | --- | --- |
|  | A1 SAMPLE GUIDE PIN | TEFLON SAMPLE GUIDE PIN |
| SAMPLE TAPE 1 | 0.54 | 0.42 |
| SAMPLE TAPE 2 | 0.47 | 0.46 |
| SAMPLE TAPE 3 | 0.55 | 0.33 |
| COMPARATIVE TAPE 1 | 0.60 | 0.50 |
| COMPARATIVE TAPE 2 | 0.62 | 0.52 |

From checked results of the dynamic frictional coefficient and wear resistance, it was found that the sample tapes 1 to 3 exhibited dynamic coefficients with respect to the sample guide pins which are lesser than those of the Comparative Tapes 1 and 2 and surface states after running 100 times were more favorable than those of the Comparative Tapes, as shown in Table 2. It is seen from this that a low friction and improved wear resistance as well as satisfactory running performance and durability may be achieved by using a protective film formed of a soluble high polymer material having a contact angle with water and a glass transition temperature as defined by the present invention.

As for wear resistance, the sample tape 1 with the protective film of SAITOP, the sample tape 2 with the protective film of Teflon 1600 and the sample tape 3 with the protective film of Teflon AF 2400, among the tapes provided with the protective films of the fluorine-based polymers, exhibit the wear resistance values increasing in this sequence. This is an indication that high wear resistance may be obtained effectively by controlling the glass transition temperature of the protective film.

Meanwhile, the sample tapes 2 and 3 and the Comparative Tape 2 were caused to travel on a helical scan type rotating drum system which is close to the ½ inch VTR system in current use. It was confirmed that the Comparative Tape 2 exhibited strong stick slip and failed to run smoothly, while the sample tapes displayed satisfactory running performance.

Studies in Recording/Playback Characteristics of Tape-Shaped Optical Recording Medium The recording/playback characteristics were checked of the sample tapes 2 and 3 which exhibited particularly desirable tape running performance and wear resistance.

Figure 3:
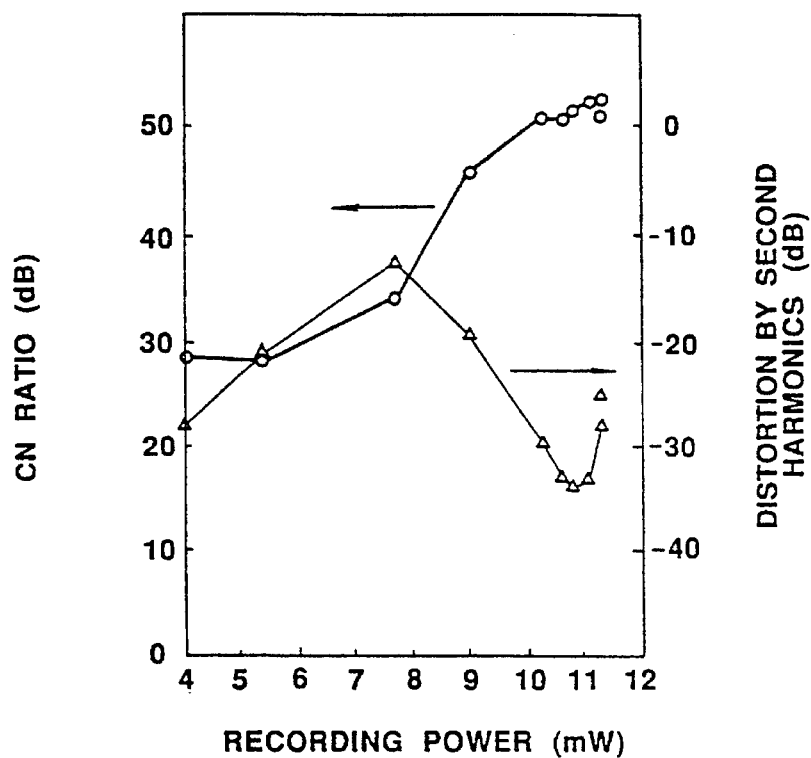
FIG. 3 is a graph showing recording/playback characteristics of an optical recording medium provided with a protective film formed of a fluorine-based polymer.
Figure 4:
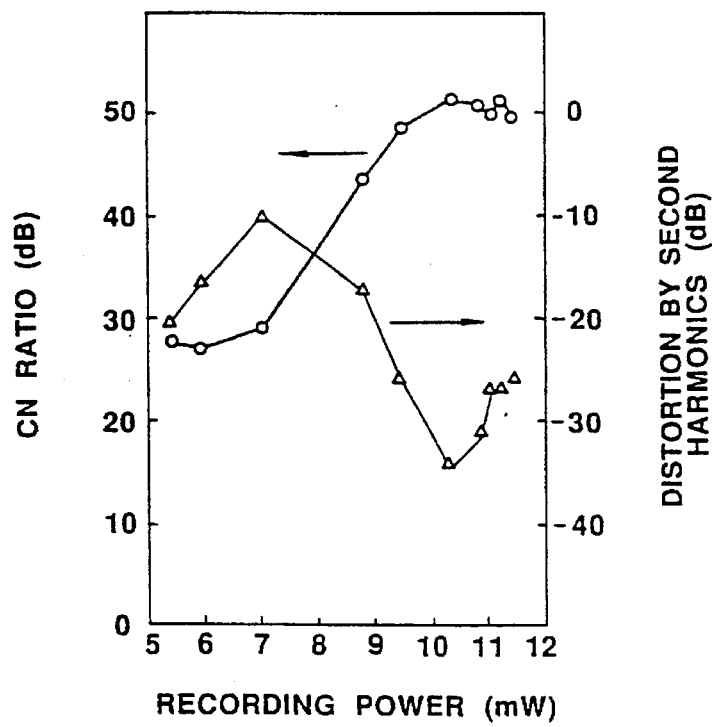
FIG. 4 is a graph showing recording/playback characteristics of an optical recording medium provided with a protective film formed of another fluorine-based polymer.
Figure 5:
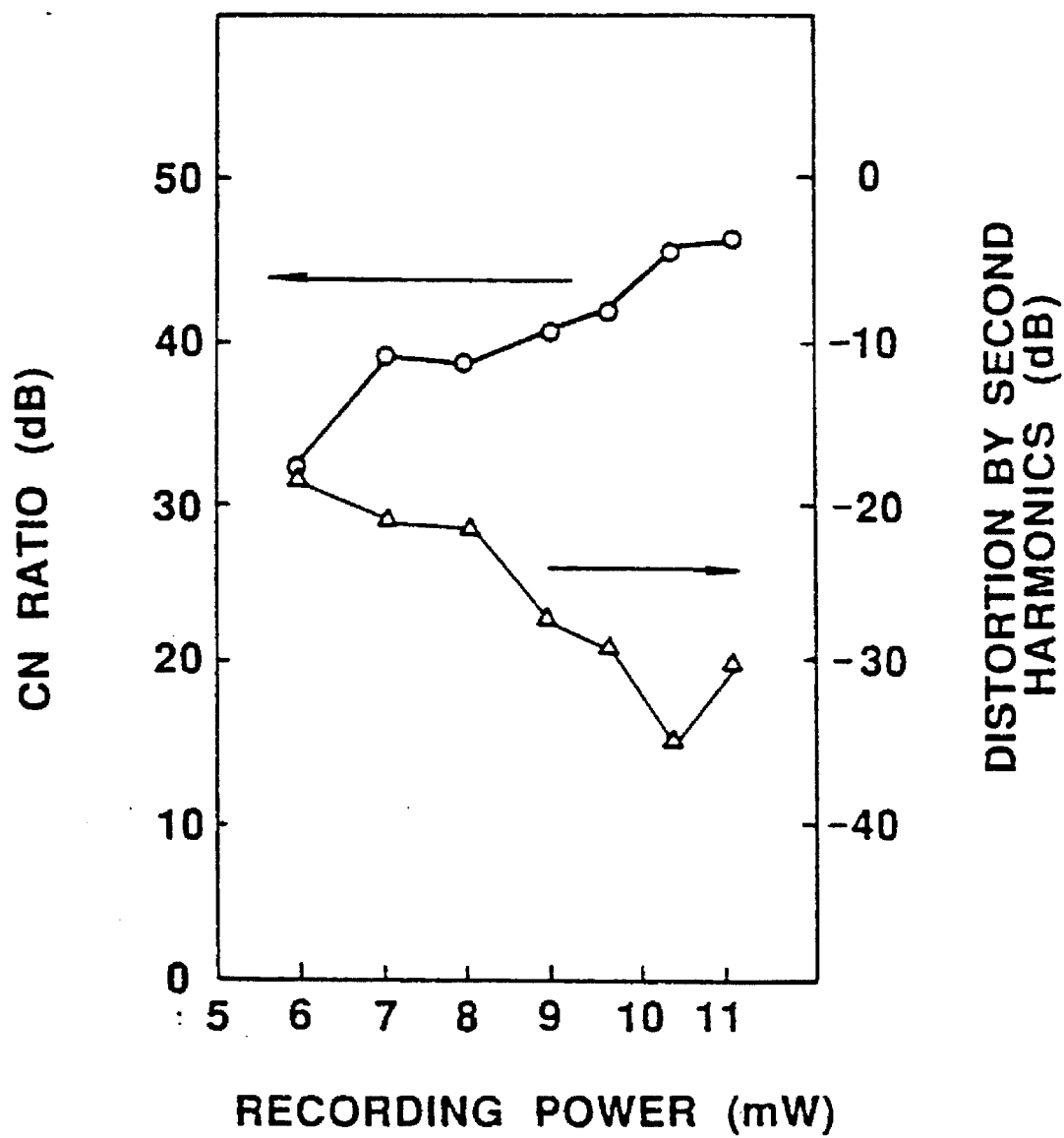
FIG. 5 is a graph showing recording/playback characteristics of an optical recording medium not provided with a protective film.

It is noted that the recording/playback characteristics were checked by measuring the CN ratio and the distortion by second harmonics (SHD) in case of recording by a laser wavelength of 780 nm, a linear velocity of 10 m/sec, a carrier frequency of 5 MHz and a duty factor of 50%. FIGS. 3, 4 and 5 show the recording/playback characteristics of the sample tape 1, the sample tape 2 and the comparative tape 2 not having the protective film, respectively.

In FIGS. 3 to 5, if, as an index for the tape recording sensitivities, the values of the recording power $Ps_{min}$ which will give a minimum second harmonic distortion of the tapes are compared to one another, it is seen that the value of $Ps_{min}$ for the comparative tape not having the protective film is 10 mW, while that for the sample tape 2 having the Teflon AF 1600 protective film is 11 mW and that for the sample tape 3 having the Teflon AF protective film is 10 mW, thus indicating that the recording sensitivity is substantially not deteriorated by provision of the protective film. On the other hand, the CN ratio of the sample tapes 2 and 3 is as high as 50 dB or higher, which is approximately equal to that of the Comparative Tape 2 not having the protective film.

It is seen from the above results that the protective film optimized in contact angle with water, glass transition point and film thickness may be used advantageously without deteriorating the recording sensitivities or the CN ratio of the optical recording medium.

For comparison, recording/playback characteristics of a comparative tape 3 having a protective film with a film thickness of $\lambda/n$ (approximately 500 nm which is a film thickness range comprised in the range b in FIG. 1) were checked in the similar manner. With this tape, the playback characteristics were inferior, with the CN ratio being of the order of only 30 dB.

It may be seen from the above that, for producing satisfactory recording/playback characteristics, it is necessary that the film thickness of the protective film be optimized, that is, within the range a of from 0.25 $\lambda/n$ to 0.5 $\lambda/n$ in FIG. 1.

What is claimed is:

1. An optical recording medium comprising a flexible base and a recording layer adapted for recording and/or reproducing the information formed thereon, said recording layer having formed thereon a protective film of a high polymer material having a contact angle with respect to water of not less than 100° with respect to water at 25° C. and a glass transition temperature of not lower than 100° C., said protective film having a film thickness of not less than 0.25 $\lambda/n$ and not more than 0.5 $\lambda/n$, where $\lambda$ is a wavelength of a playback light and n is a refractive index of the protective film.

2. An optical recording medium as claimed in claim 1 wherein the refractive index n is in the range of from 1.25 to 1.5.

3. An optical recording medium as claimed in claim 1 wherein the high polymer is a fluorine-based polymer.

4. An optical recording medium as claimed in claim 1 wherein the high polymer is a tetrafluoroethylene-dioxole copolymer.

5. An optical recording medium as claimed in claim 1 wherein the optical recording material contained in the recording layer is an organic optical recording material.

\* \* \* \* \*